United States Patent [19]

Priddy et al.

[11] Patent Number: 5,408,023
[45] Date of Patent: Apr. 18, 1995

[54] PREPARATION OF MODIFIED VINYL POLYMERS

[75] Inventors: Duane B. Priddy; Brian R. Maurer, both of Midland, Mich.

[73] Assignee: The Dow Chemical Company, Midland, Mich.

[21] Appl. No.: 184,166

[22] Filed: Jan. 21, 1994

Related U.S. Application Data

[63] Continuation-in-part of Ser. No. 705,403, May 24, 1991, abandoned, which is a continuation-in-part of Ser. No. 425,160, Oct. 23, 1989, abandoned.

[51] Int. Cl.$^6$ .................. C08F 212/08; C08F 220/18; C08F 222/40
[52] U.S. Cl. .................... 526/262; 526/286; 526/310; 526/312; 526/329.2; 525/282; 525/285; 525/310; 525/316
[58] Field of Search .............. 526/262, 286, 310, 312, 526/329.2

[56] References Cited

U.S. PATENT DOCUMENTS

| | | |
|---|---|---|
| 2,129,685 | 10/1938 | Graves . |
| 2,259,512 | 11/1941 | Barnes . |
| 2,276,138 | 3/1942 | Alderman et al. ............. 525/366 |
| 2,471,766 | 5/1949 | Mowry et al. . |
| 4,025,580 | 5/1977 | Taylor . |
| 4,131,728 | 12/1978 | Priddy . |
| 4,609,711 | 9/1986 | Younes ............. 525/186 |
| 4,626,573 | 12/1986 | Younes ............. 525/148 |
| 4,661,574 | 4/1987 | Younes ............. 526/262 |
| 5,140,083 | 8/1992 | Kato ............. 526/262 |
| 5,274,059 | 12/1993 | Kato ............. 526/262 |

FOREIGN PATENT DOCUMENTS 0181807 3/1989 Japan .

OTHER PUBLICATIONS

*Polymer Bulletin*, Springer–Verlag 1980, vol. 2, pp. 21–24.

*Primary Examiner*—Vasu S. Jagannathan

[57] ABSTRACT

Addition polymers of ethylenically unsaturated monomers are provided comprising a 5-, 6- or 7-membered polymer unit formed from a copolymerizable, unsaturated, chain transfer agent containing a labile hydrogen and capable of forming by means of a hydrogen shift mechanism a free radical having 5, 6 or 7 atoms between and including the α-carbon of the ethylenically unsaturated group and the labile hydrogen.

7 Claims, No Drawings

PREPARATION OF MODIFIED VINYL POLYMERS

CROSS REFERENCE TO RELATED APPLICATION

This is a continuation-in-part of Ser. No. 705,403, filed May 24, 1991, which is a continuation-in-part of Ser. No. 425,160, filed Oct. 23, 1989, now abandoned.

This invention relates to modifying properties of polymeric materials. In particular, the invention is concerned with modifying the structure and properties of vinyl polymeric materials.

Vinyl polymers to which the present invention pertains are formed by the free radical polymerization of ethylenically unsaturated monomers. Examples include α-olefins such as ethylene, propylene, etc. and substituted vinyl compounds such as vinyl aromatic monomers, vinyl chloride, vinyl acetate, acrylic acid, butyl acrylate, etc. Also included are α-substituted vinyl monomers such as methacrylic acid, methyl methacrylate, α-methylstyrene, etc. Preferred vinyl monomers are the vinyl aromatic monomers and vinyl chloride. Vinyl polymers are an important class of thermoplastic polymeric materials. Their impact resistance, tensile and flexural strength, elongation and bend values make these polymers extremely useful in fields where strength, durability and ease of manufacture are desired. The vinyl polymers are conventionally molded in sheet form and structural form, designed and adaptable as packaging structures, housings, support structures, furniture, molded articles, toys, architectural trim, motor housings, television cabinets and the like.

A variety of approaches to modifying the properties of vinyl polymers, particularly the flexibility and elongation properties thereof have been proposed. Suitable techniques include the use of various additives, such as plasticizers, fillers, lubricity aids and the like. Disadvantageously however, additives are subject to migration from a polymer blend resulting in loss of the desired property from the polymer or interference with desired properties of the polymer. For example loss of a plasticizing additive during the molding process adds to molding costs due to the necessity to periodically clean the molding equipment. In addition the fugitive additive may degrade properties of the resulting product such as surface appearance.

It would therefore be desirable to provide certain polymerizable additives that may be readily incorporated into a vinyl polymer to increase the flexibility of articles molded therefrom without the need to incorporate plasticizers.

According to the present invention there is provided a copolymer comprising the polymerization product of one or more $C_{2-16}$ vinyl monomers and a copolymerizable, ethylenically unsaturated, chain transfer agent containing a labile hydrogen subject to intramolecular chain transfer and hydrogen shift under vinyl polymerization reaction conditions so as to form a free radical containing 5, 6 or 7 atoms between and including the α-carbon of the ethylenically unsaturated group and the labile hydrogen, said polymer comprising in the polymer backbone the addition polymerization product of such 5-, 6- or 7-membered radical.

Because the polymer product resulting from the present process incorporates a longer chain remnant than the normal $C_2$ moiety resulting from the vinyl group, the resulting polymer has greater randomness and disorder and a concomitant reduction in crystallinity. Accordingly, the polymers possess greater flexibility when molded into articles.

In one embodiment of the invention, carbonyl and similar functionality can be incorporated into the polymer backbone. The resulting polymers generally are more readily photodegradeable and biologically degradeable because of this fact.

In the present invention, the properties of vinyl resins are modified by incorporating therein a chain transfer agent capable of undergoing an intramolecular chain transfer (H-shift). This results in the incorporation into the polymer backbone of 5, 6 or 7 atoms of the polymerizable chain transfer agent rather than only the two carbon atoms originally constituting the vinyl group. This result is achieved by polymerizing at least one vinyl monomer in the presence of a copolymerizable, unsaturated, chain transfer agent containing a labile hydrogen and capable of forming a free radical which contains 5, 6, or 7 atoms between and including the α-carbon of the ethylenically unsaturated group and the labile hydrogen. It is believed, without wishing to be bound by such belief, that the copolymerizable, unsaturated chain transfer agent exists temporarily during the polymerization in a transitory condition as a free radical with 5, 6 or 7 atoms, including carbon and non-carbon atoms, starting with the labile hydrogen to and including the alpha carbon of the unsaturated group. The copolymers of this invention are random copolymers having at least one polymeric unit comprising at least one polymerized vinyl monomer and at least one polymeric unit comprising the 5-, 6- or 7-membered remnant resulting by means of the aforementioned hydrogen shift from the polymerized unsaturated chain transfer agent.

Preferably from 0.01 to 90 mole percent, more preferably 0.1 to 10 mole percent (based on total monomer content) of the ethylenically unsaturated chain transfer agent is incorporated into the polymer of the present invention. Not all of the chain transfer agent is necessarily incorporated into the polymer by means of the foregoing hydrogen shift mechanism. Preferably from 1.0 to 90 mole percent, more preferably from 10 to 75 mole percent of such H-shifted polymer units result. The remaining units add by a typical 1,2-vinyl addition mechanism.

Preferred vinyl monomers are vinylaromatic monomers, particularly styrene, vinyl chloride, and mixtures of styrene with acrylonitrile, methyl methacrylate, maleic anhydride, or N-phenylmaleimide. The polymerization may be conducted in the presence of an impact modifier especially an elastomer such as polybutadiene or a styrene-butadiene copolymer. A preferred vinyl monomer is styrene.

The copolymerizable, unsaturated chain transfer agents that are used according to the present invention are characterized by the presence of a mono-olefinically unsaturated group and a labile hydrogen atom. By the term "labile" is meant the hydrogen is capable of leaving its original position within the monomer and bonding to the α-carbon of the ethylenically unsaturated group. The free radical is reformed at the site experiencing the loss of the labile hydrogen and a 5-, 6- or 7-membered polymer moiety is incorporated into the polymer instead of the $C_2$ or substituted $C_2$ group normally associated with vinyl polymerizations.

More particularly, the chain transfer agents have the formula:

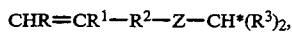

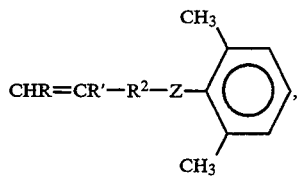

or

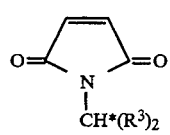

wherein:

R is hydrogen, $C_{1-6}$ alkyl, $C_{6-14}$ aryl, $C_{2-6}$ alkoxycarbonyl or a carbonyl group attached to a nitrogen containing Z group;

$R^1$ is hydrogen, $C_{1-6}$ alkyl; optionally R and $R^1$ together form:

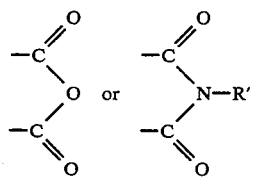

wherein R' is $C_{1-6}$ alkyl or phenyl;

$R^2$ is a 1,2- or 1,3-arylene group of from 6 to 14 carbons or carbonyl;

$R^3$ is H, $C_{1-6}$ alkyl or an activating group selected from the group consisting of nitrile, $C_{2-6}$ alkoxycarbonyl, $C_{2-6}$ alkylcarbonyl and $C_{6-14}$ aryl;

Z is —O—, —S—, a covalent bond or N-R" wherein R" is $C_{1-6}$ alkyl, phenyl or a covalent bond attached to a carbonyl R group;

$R^4$ is methyl or ethyl;

$R^5$ is hydrogen or $R^4$; and

H* is an activated hydrogen able to transfer intramolecularly under polymerization conditions to the α-carbon of the ethylchic group.

The labile hydrogen preferably has a chain transfer constant (measure of activity of the labile hydrogen to the growing free radical-polymerized polymer chain) of at least 0.001, and more preferably in the range from 0.01 to 1. In addition, the transfer of the labile hydrogen atom intramolecularly must occur via a 5-, 6- or 7-membered transition state. Representative chain transfer agents of the invention include:

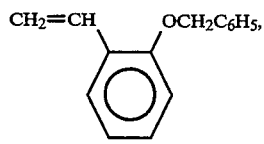

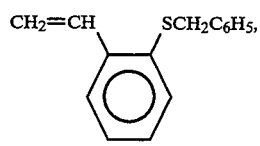

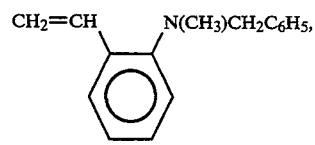

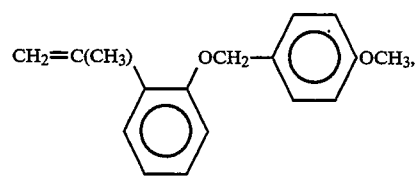

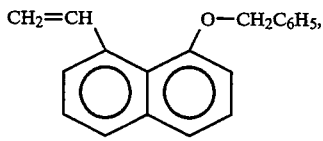

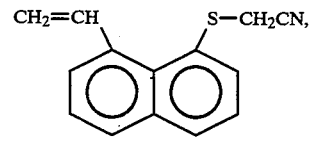

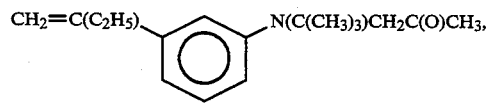

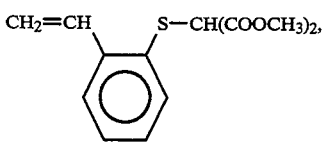

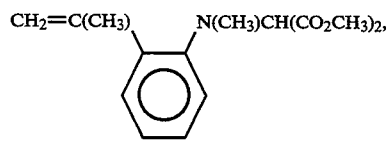

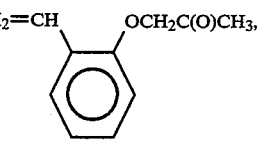

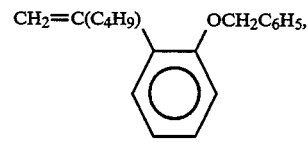

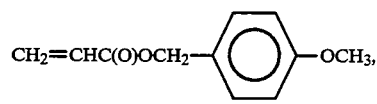

-continued

CH₂=CHC(O)NCH₃CH₂CN,

CH₂=C(CH₃)COOCH(CH₃)C(O)CH₃,

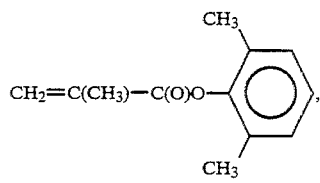

CH₂=CHC(O)OCH₂CN,

CH₂=CH(CH₃)—C(O)N(CH₃)CH₂C₆H₆,

CH(C(O)OCH₃)=CHC(O)OCH₂C(O)C₂H₅,

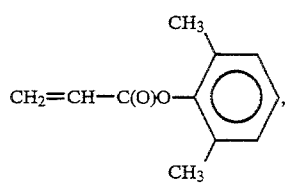

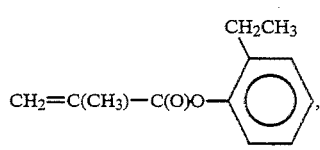

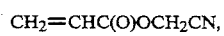

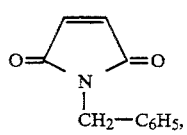

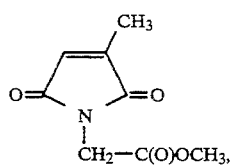

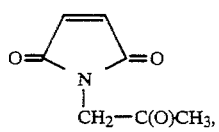

-continued

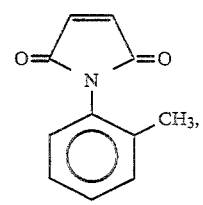

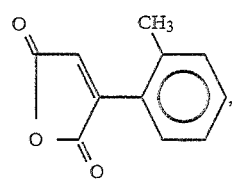

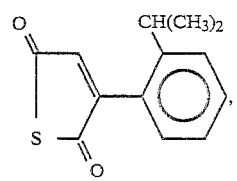

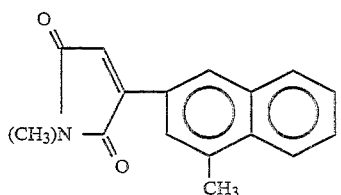

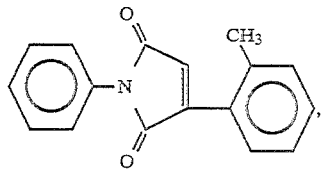

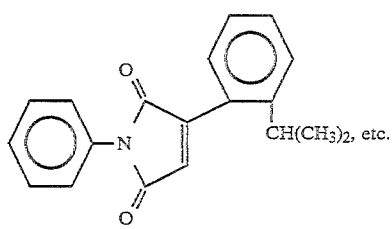

In accordance with the present invention, the free radical polymerization of a mixture comprising at least one vinyl monomer and at least one copolymerizable, unsaturated chain transfer agent of the invention which can exist as a free radical in a 5-, 6- or 7-membered transition state as herein described is thought to proceed through an intramolecular chain transfer mechanism according to the following idealized reaction wherein · represents the free radical site:

CHR=CR¹—R²—Z—CH*(R³)₂ ——→

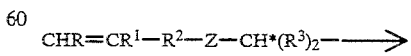

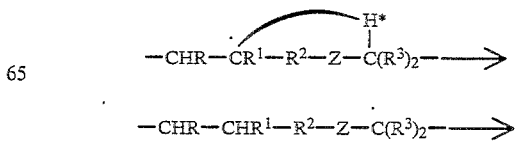

-continued

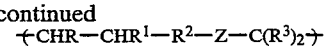

In a similar manner, the intermolecular chain transfer mechanism for chain transfer agents corresponding to the formula:

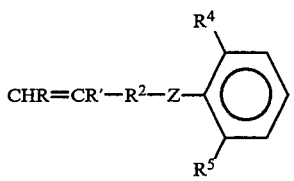

may be depicted as follows:

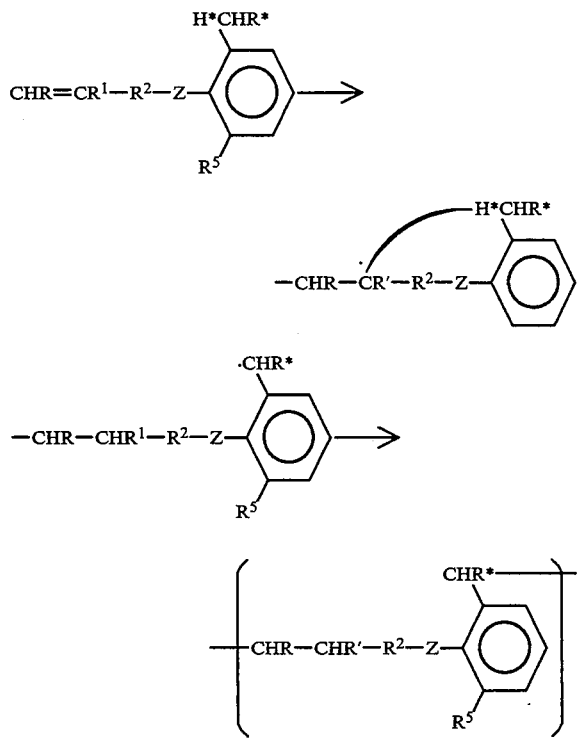

wherein R* is hydrogen or methyl.

The copolymerization of the copolymerizable, unsaturated chain transfer agents and vinyl monomers including mixtures of vinyl monomers, can be effected by any of the continuous bulk, suspension and solution polymerization techniques commonly employed for the polymerization of vinyl monomers. The novel modified polymers of this invention are formed by mixing the polymerizable vinyl monomer-containing composition with the chain transfer agents, preferably in the presence of at least one free radical polymerization initiator.

Generally, from 1 to 80, preferably 1 to 20, weight percent of chain transfer agent will be included in the polymerization reaction mixture. Styrene is the most highly preferred vinyl monomer and, when polymerized with one or more other vinyl monomers and/or non-vinyl monomers, the amount of styrene is preferably at least 50 percent of the polymerizable monomer charge. Preferably, the polymerization is carried out under solution polymerization conditions in the presence of from 2 to 30 weight percent of an inert liquid solvent, such as benzene, ethylbenzene, xylene or the like and saturated aliphatic compounds having straight or branched chains of 5 or more carbon atoms, such as heptane, hexane, octane and the like. The aromatic liquid diluents are currently preferred, with ethylbenzene and xylene being the most preferred.

Substantially any of the known free radical polymerization catalysts or initiators such as organic peroxide, hydroperoxide or hydroquinone compounds can be employed in the polymerization reactions of the invention. The polymerization is effected at conditions which are commonly employed in the polymerization of vinyl monomers. Typical reaction temperatures are from 50° C. to 180° C., preferably from 90° C. to 160° C.

The following examples illustrate the present invention and should not be construed to limit its scope. In the examples, all parts and percentages are by weight unless otherwise indicated.

EXAMPLE 1

Preparation of 2,6-dimethylphenyl methacrylate

Fresh, distilled methacryloyl chloride (80 grams) and 2,6-dimethylphenol (60 grams) were placed in a 500 cc round bottom glass flask equipped with a 15 inch variable reflux distillation column. The distillation column was vented and the flask was heated at 100° C. until evolution of hydrogen chloride ceased (about one hour). Reduced pressure is then applied and the mixture fractionated at a 3:1 reflux ratio. The highest boiling fraction (95°-96° C. at 1 Torr) gave a proton NMR consistent with the desired product, 2,6-dimethylphenyl methacrylate. The product is a water-white oil.

Copolymerization of 2,6-dimethylphenyl methacrylate and styrene

Three glass ampoules were each loaded with 2,6dimethylphenyl methacrylate. To one of these ampoules 2 mole percent styrene was added. To another ampoule 2000 parts per million dicumyl peroxide initiator was added. The third ampoule contained pure 2,6-dimethylphenyl methacrylate. The ampoules were sealed under nitrogen and placed in an oil bath at 130° C. for 18 hours. The contents of each ampoule was then poured into methanol. Only the contents of the ampoule containing both styrene and 2,6-dimethylphenyl methacrylate resulted in a precipitate. The precipitate was collected and analyzed by $C^{13}$ nuclear magnetic resonance spectroscopy. The spectrum was consistent with following structures 1 and 2 being present in the mole ratio of 70:30. Structure 2 is caused by intramolecular hydrogen chain transfer via a stable free radical containing 7 members between the α-carbon of the vinyl group and including the labile hydrogen of the aromatic methyl group. Styrene content of the resulting polymer was 10 weight percent.

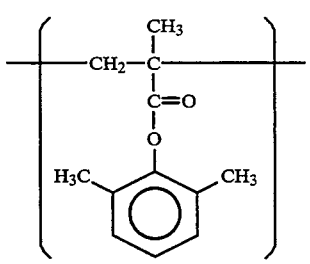

1.

-continued

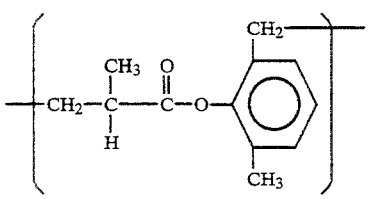

This result indicates that copolymers containing any quantity of the desired polymer unit are readily preparable using ordinary free radical polymerization techniques. However, in the absence of a copolymerizable vinyl monomer no polymerization takes place.

It is understood that the above are merely preferred embodiments and that various changes and alteration can be made without departing from the spirit and broader aspects of the invention.

What is claimed is:

1. A random copolymer comprising one or more vinyl monomers and at least one copolymerizable, unsaturated chain transfer agent having a labile hydrogen with a chain transfer constant of at least 0.001 corresponding to the formula:

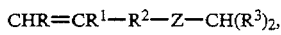

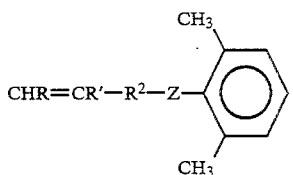

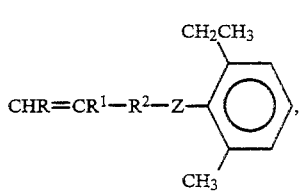

or

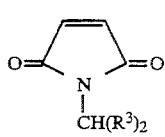

wherein:
R is hydrogen, $C_{1-6}$ alkyl, $C_{6-14}$ aryl, or $C_{2-6}$ alkoxycarbonyl;
$R^1$ is hydrogen, $C_{1-6}$ alkyl and optionally R and $R^1$ together form:

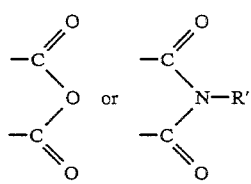

wherein R' is $C_{1-6}$ alkyl or phenyl;
$R^2$ is a 1,2- or 1,3-arylene group of from 6 to 14 carbons or carbonyl;

$R^3$ is H, $C_{1-6}$ alkyl or an activating group selected from the group consisting of nitrile, $C_{2-6}$ alkoxycarbonyl, $C_{2-6}$ alkylcarbonyl and $C_{6-14}$ aryl;
Z is —O—, —S—, a covalent bond or N-R" wherein R" is $C_{1-6}$ alkyl, or phenyl;
$R^4$ is methyl or ethyl;
$R^5$ is hydrogen or $R^4$; said copolymer comprising in the polymer backbone the addition polymerization product of a radical formed by intramolecular chain transfer and hydrogen shift of the chain transfer agent via a 5-, 6-, or 7-membered transition state.

2. A random copolymer according to claim 1 wherein the copolymer comprises a polymeric unit corresponding to the formula:

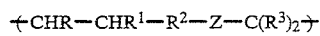

wherein R, $R^1$, $R^2$, Z and $R^3$ are as previously defined.

3. A random copolymer according to claim 1 wherein the vinyl monomer is styrene.

4. A random copolymer according to claim 1 comprising one or more vinyl monomers and at least one copolymerizable, unsaturated chain transfer agent corresponding to one of the following formulae:

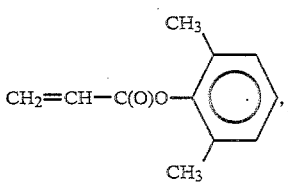

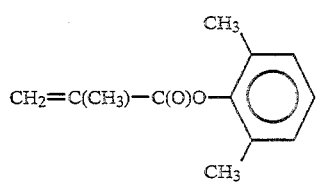

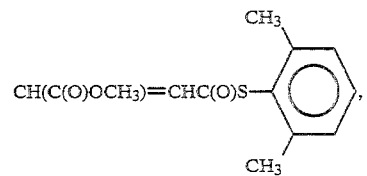

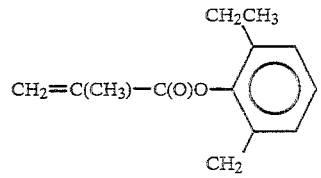

or

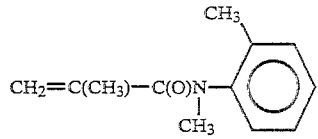

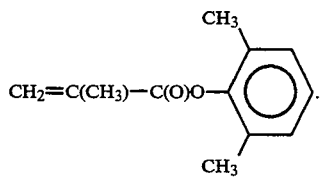
5. A random copolymer according to claim 4 wherein the vinyl monomer is styrene.
6. A random copolymer according to claim 1 comprising one or more vinyl monomers and at least one copolymerizable, unsaturated chain transfer agent corresponding to the formula:
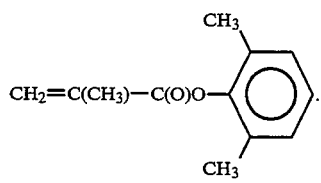
7. A random copolymer according to claim 6 wherein the vinyl monomer is styrene.
* * * * *

UNITED STATES PATENT AND TRADEMARK OFFICE
CERTIFICATE OF CORRECTION

PATENT NO. : 5,408,023

DATED : April 18, 1995

INVENTOR(S) : Duane B. Priddy

It is certified that error appears in the above-identified patent and that said Letters Patent is hereby corrected as shown below:

Claim 4, delete the formula at the top of column 11,

" 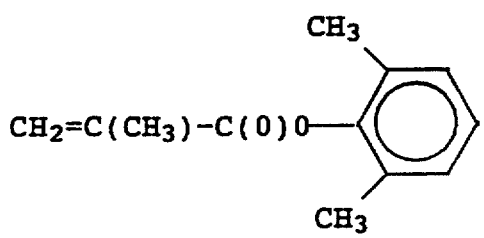 "

UNITED STATES PATENT AND TRADEMARK OFFICE
CERTIFICATE OF CORRECTION

PATENT NO. : 5,408,023
DATED : April 18, 1995
INVENTOR(S) : Duane B. Priddy et al.

Page 2 of 2

It is certified that error appears in the above-indentified patent and that said Letters Patent is hereby corrected as shown below:

Claim 4, column 10, lines 53-60, formula 4, delete

"
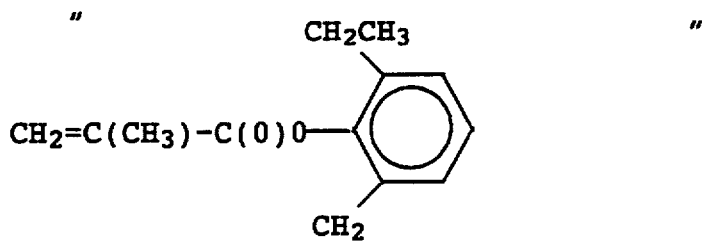
"

and insert therefor

-- 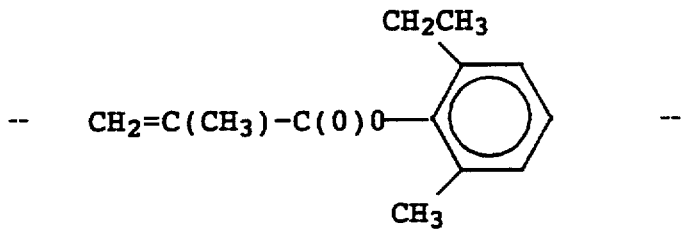 --

Signed and Sealed this

Twenty-third Day of July, 1996

Attest:

BRUCE LEHMAN

Attesting Officer

Commissioner of Patents and Trademarks